(12) United States Patent
Yoon (10) Patent No.: US 7,548,406 B2
(45) Date of Patent: Jun. 16, 2009

(54) METHOD FOR UTILIZING A BULK ERASE TOOL TO ERASE PERPENDICULARLY RECORDED MEDIA

(75) Inventor: Taeyong Yoon, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 439 days.

(21) Appl. No.: 11/408,838

(22) Filed: Apr. 21, 2006

(65) Prior Publication Data
US 2007/0247947 A1     Oct. 25, 2007

(51) Int. Cl.
*H01H 47/00* (2006.01)
(52) U.S. Cl. ........................ 361/139; 361/143
(58) Field of Classification Search ......... 361/139, 361/143, 146, 147, 149, 151
See application file for complete search history.

(56) References Cited

U.S. PATENT DOCUMENTS

| | | | | |
|---|---|---|---|---|
| 5,416,664 A | * | 5/1995 | Becker et al. | 361/149 |
| 6,731,491 B2 | * | 5/2004 | Schultz | 361/149 |
| 2006/0018075 A1 | * | 1/2006 | Schultz | 361/143 |

* cited by examiner

*Primary Examiner*—Danny Nguyen (57) ABSTRACT

A method for utilizing a bulk erase tool to erase perpendicularly recorded media is provided. A bulk erase tool having a first polarity erase magnet and a second polarity erase magnet is received. An offset is provided between the first polarity erase magnet and the second polarity erase magnet, wherein the offset provides a non-parallel non-vertical applied magnetic field suitable for erasing perpendicularly recorded media.

20 Claims, 8 Drawing Sheets

METHOD FOR UTILIZING A BULK ERASE TOOL TO ERASE PERPENDICULARLY RECORDED MEDIA

TECHNICAL FIELD

This invention relates to the field of hard disk drives, and more particularly to a method for utilizing a bulk erase tool to erase perpendicularly recorded media.

BACKGROUND ART

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model was established approximately 50 years ago and resembles a phonograph. That is, the hard drive model includes a storage disk or hard disk that spins at a standard rotational speed. An actuator arm with a suspended slider is utilized to reach out over the disk. The arm carries a head assembly that has a magnetic read/write transducer or head for reading/writing information to or from a location on the disk. The complete head assembly, e.g., the suspension and head, is called a head gimbal assembly (HGA).

In operation, the hard disk is rotated at a set speed via a spindle motor assembly having a central drive hub. Additionally, there are circumferential tracks evenly spaced at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Over the years, the disk and the head have undergone great reductions in their size. Much of the refinement has been driven by consumer demand for smaller and more portable hard drives such as those used in personal digital assistants (PDAs), MP3 players, and the like. For example, the original hard disk drive had a disk diameter of 24 inches. Modern hard disk drives are much smaller and include disk diameters 3.5 to 1 inches (and even smaller 0.8 inch). Advances in magnetic recording are also primary reasons for the reduction in size.

For example, advances have led to storage capacities in the range of 120 gigabytes (GB) per square inch of disk real estate. Thus, multi-hard disk drives have capacities in the range hundreds of gigabytes. In the present environment, even small improvements in storage techniques can produce large absolute changes in total capacity. For example, a 4% improvement in the capacity of a 250 GB hard disk drive results in an extra 10 GB of additional storage capacity. This is more than the original capacity of hard disk drives offered in the late 1990's. Utilizing perpendicular recording methods is one way for improving capacity of the disk.

When assembling the mechanical components to form the hard disk drive, servo patterns are written on the new disks to prepare the hard disk drives for customer use. However, there are cases when the servo patterns have to be re-written. In those cases, existing servo patterns have to be erased before new servo patterns may be re-written. For example, servo patterns have to be rewritten when the initial servo writing fails, if the servo writing was successful, but the disk drive fails functional tests, or if complete or partial disassembly and reassembly of the mechanical components is needed.

Generally, a bulk erase tool is a magnetic device used to erase the (servo or other) patterns on the disk of a hard disk drive. The advantage of using the bulk erase tool over using the head erase within the hard disk drive is the fast and easy operation of the bulk erase tool. For example, a head erase of the disk may take 20 minutes while a bulk erase of the disk may only take 10 seconds.

However, as disk coercivity becomes higher due in part to the perpendicular recording methods used, the required magnetic field in the bulk erase tool also becomes higher and increases the possibility of damaging the motor magnet and heads of the hard disk drive. For example, erasing perpendicularly recorded media requires a strong applied magnetic field. However, the motor magnet is also exposed to the strong magnetic field which leads to demagnetization of the motor magnet. Moreover, if the applied magnetic field is adjusted such that no demagnetization of the motor magnet occurs, then the erase field acting on the ID track of the disk may not strong enough to completely erase the disk resulting in residual disk signals. These un-erased tracks then have to be head-erased which is, as described herein, a time-consuming process.

SUMMARY

A method for utilizing a bulk erase tool to erase perpendicularly recorded media is provided. A bulk erase tool having a first polarity erase magnet and a second polarity erase magnet is received. An offset is provided between the first polarity erase magnet and the second polarity erase magnet, wherein the offset provides a non-parallel non-vertical applied magnetic field suitable for erasing perpendicularly recorded media.

BEST MODES FOR CARRYING OUT THE INVENTION

Reference will now be made in detail to the alternative embodiment(s) of the present invention, a bulk erase tool. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments described herein provide bulk erase tool for erasing perpendicularly recorded (PR) media using an off-set magnetic erase field. Moreover, unlike prior bulk erase tools, the present bulk erase tool provides an increase in the field strength by utilizing Stoner Wohlfarth behavior characteristics. In other words, embodiments described herein provide a more powerful magnetic erase capability for a bulk erase tool by utilizing a non-parallel non-vertical generated field using two misaligned poles thereby providing a stronger switching field without requiring a significant increase in magnet field generation.

Figure 1:
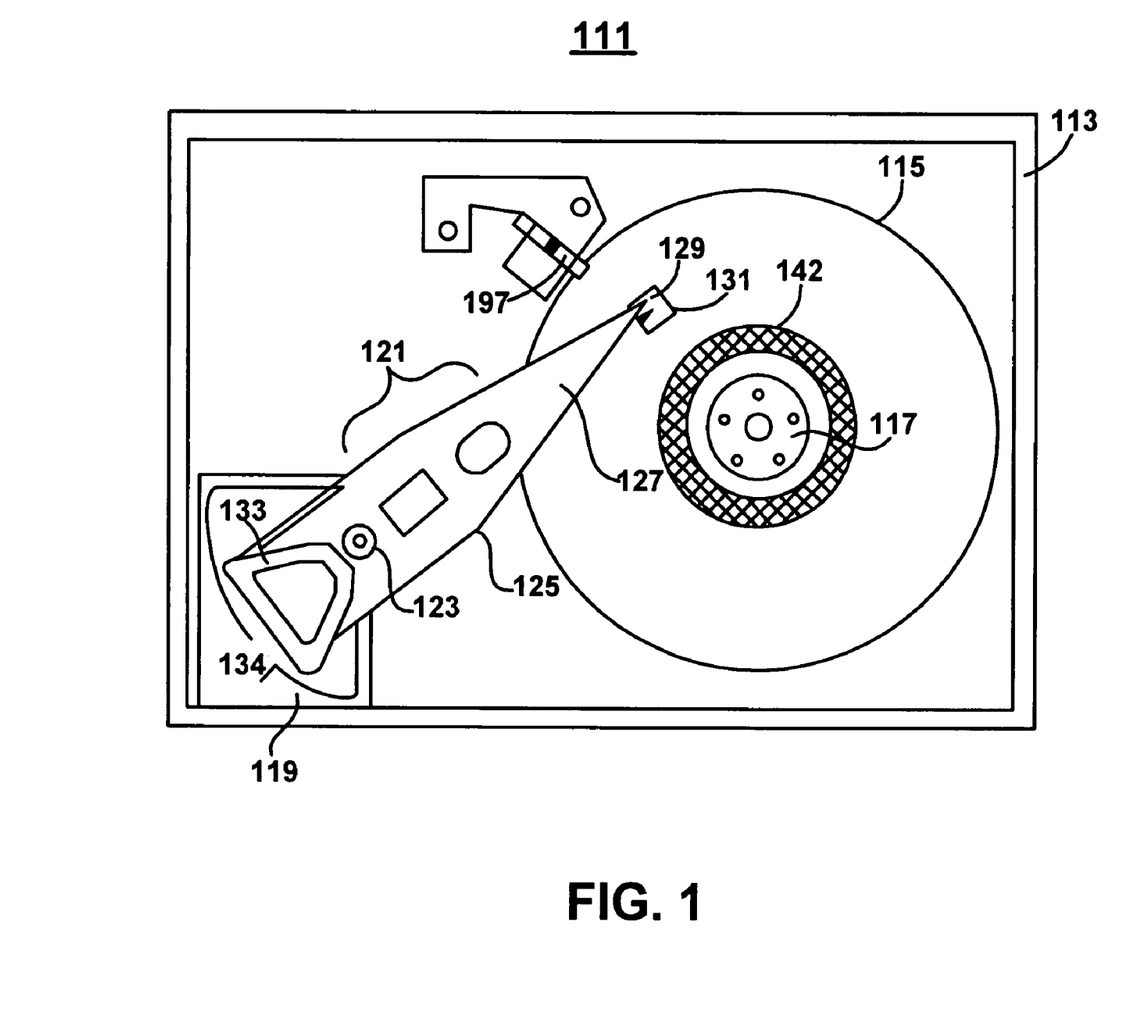
FIG. 1 is a plan view of an HDD with cover and top magnet removed in accordance with one embodiment of the present invention.

With reference now to FIG. 1, a schematic drawing of one embodiment of an information storage system comprising a magnetic hard disk file or drive 111 for a computer system is shown. Although a hard disk drive having a single disk is shown, embodiments of the invention are well suited for utilization on a hard disk drive having a plurality of disks therein. Furthermore, the single disk hard drive of FIG. 1 is merely one version of a plurality of hard disk drive configurations that may be utilized in conjunction with the present invention. For example, in one embodiment the hard disk drive 111 would use load/unload (L/UL) techniques with a ramp 197 and a nose limiter. In another embodiment, the drive 111 is a non L/UL drive, for example, a contact start-stop (CSS) drive having a textured landing zone 142 away from the data region of disk 115.

In the exemplary FIG. 1, Drive 111 has an outer housing or base 113 containing a disk pack having at least one media or magnetic disk 115. A spindle motor assembly having a central drive hub 117 rotates the disk or disks 115. An actuator comb 121 comprises a plurality of parallel actuator arms 125 (one shown) in the form of a comb that is movably or pivotally mounted to base 113 about a pivot assembly 123. A controller 119 is also mounted to base 113 for selectively moving the comb of arms 125 relative to disk 115.

In the embodiment shown, arm 125 has extending from it at least one cantilevered electrical lead suspension (ELS) 127. It should be understood that ELS 127 may be, in one embodiment, an integrated lead suspension (ILS) that is formed by a subtractive process. In another embodiment, ELS 127 may be formed by an additive process, such as a circuit integrated suspension (CIS). In yet another embodiment, ELS 127 may be a flex-on suspension (FOS) attached to base metal or it may be a flex gimbal suspension assembly (FGSA) that is attached to a base metal layer. The ELS may be any form of lead suspension that can be used in a data access storage device, such as a HDD. A magnetic read/write transducer 131 or head is mounted on a slider 129 and secured to a flexible structure called "flexure" that is part of ELS 127. The read/write heads magnetically read data from and/or magnetically write data to disk 115. The level of integration called the head gimbal assembly (HGA) is the head and the slider 129, which are mounted on suspension 127. The slider 129 is usually bonded to the end of ELS 127.

ELS 127 has a spring-like quality, which biases or presses the air-bearing surface of the slider 129 against the disk 115 to cause the slider 129 to fly at a precise distance from the disk as the disk rotates and air bearing develops pressure. The ELS 127 has a hinge area that provides for the spring-like quality, and a flexing interconnect that supports read and write traces through the hinge area. A voice coil 133, free to move within a conventional voice coil motor magnet assembly 134 (top pole not shown), is also mounted to arms 125 opposite the head gimbal assemblies. Movement of the actuator comb 121 by controller 119 causes the head gimbal assemblies to move along radial arcs across tracks on the disk 115 until the heads settle on their set target tracks. The head gimbal assemblies operate in a conventional manner and always move in unison with one another, unless drive 111 uses multiple independent actuators (not shown) wherein the arms can move independently of one another.

In general, the load/unload drive refers to the operation of the ELS 127 with respect to the operation of the disk drive. That is, when the disk 115 is not rotating, the ELS 127 is unloaded from the disk. For example, when the disk drive is not in operation, the ELS 127 is not located above the disk 115 but is instead located in a holding location on L/UL ramp 197 away from the disk 115 (e.g., unloaded). Then, when the disk drive is operational, the disk(s) are spun up to speed, and the ELS 127 is moved into an operational location above the disk(s) 115 (e.g., loaded). In so doing, the deleterious encounters between the slider and the disk 115 during non-operation of the HDD 111 are greatly reduced. Moreover, due to the movement of the ELS 127 to a secure off-disk location during non-operation, the mechanical ship shock robustness of the HDD is greatly increased.

Figure 2:
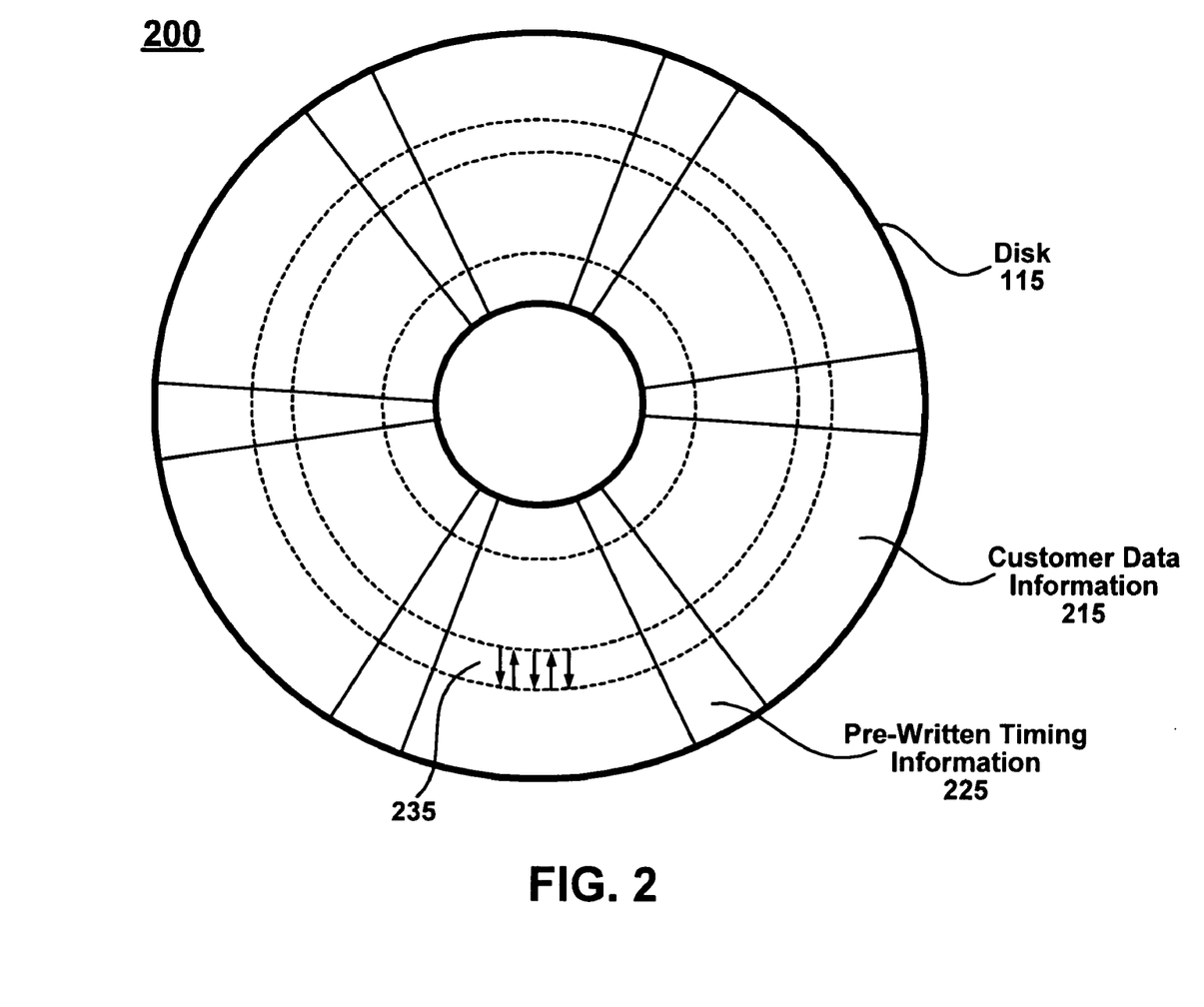
FIG. 2 is an exemplary diagram of a disk having circumferential tracks of perpendicularly recorded pre-written timing information in accordance with an embodiment of the present invention.

With reference now to FIG. 2, an exemplary diagram 200 of a disk 115 having circumferential tracks of pre-written timing information 225 and optional customer data information 215 is shown in accordance with one embodiment of the present invention. Generally, data is recorded onto disk surface 115 in a pattern of concentric rings known as data tracks 235. In one embodiment, the data written on disk 115 is written in a perpendicular format 235.

Figure 3:
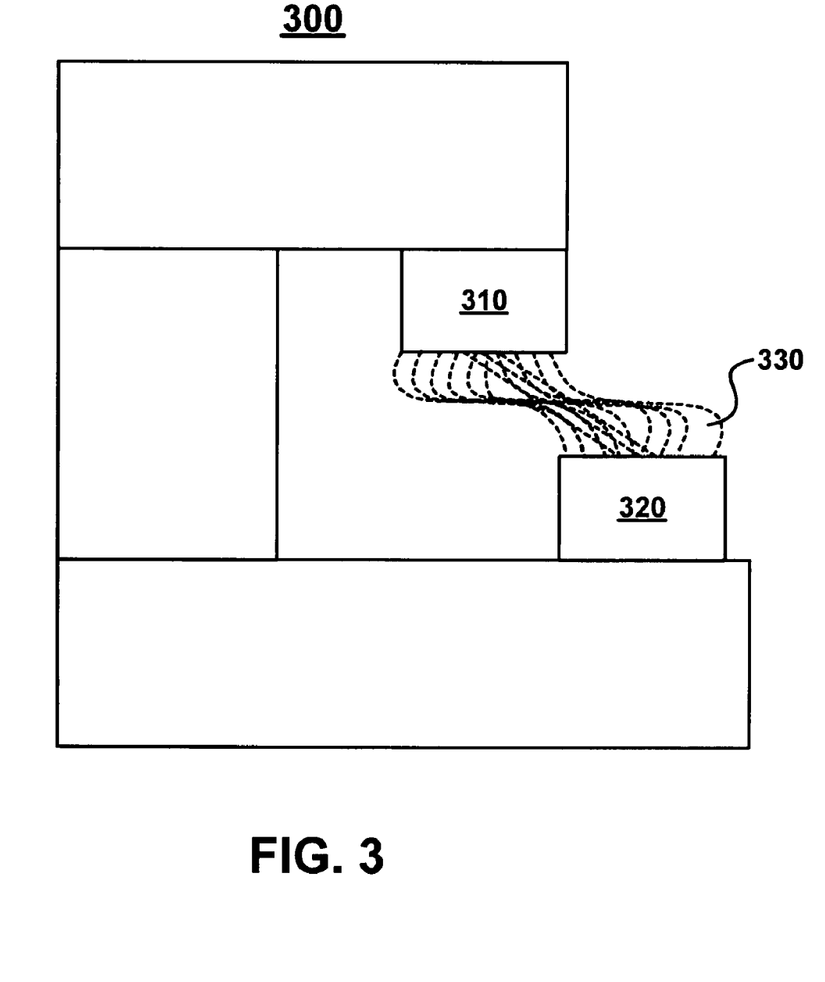
FIG. 3 is a block diagram of an exemplary fixed magnet bulk erase tool for erasing perpendicularly recorded media in accordance with one embodiment of the present invention.

Referring now to FIG. 3, a block diagram of an exemplary bulk erase tool 300 for erasing perpendicularly recorded media is shown in accordance with one embodiment of the present invention. Bulk erase tool 300 includes a first polarity erase magnet 310 and a second polarity erase magnet 320. In one embodiment, the first polarity erase magnet 310 and the second polarity erase magnet 320 are offset permanent magnets. That is, the poles of the permanent magnets of bulk erase tool 300 are misaligned to provide a non-parallel non-vertical applied magnetic field 330. In one embodiment, the non-parallel non-vertical applied field 330 is approximately at a 45 degree angle with respect to the planer surface of the bulk erase tool 300. Although the applied field 330 is described as approximately 45 degrees, it is understood that the angle of the applied field 330 may be more or less than 45 degrees. The utilization of 45 degrees herein is merely for purposes of brevity and clarity.

Figure 4:
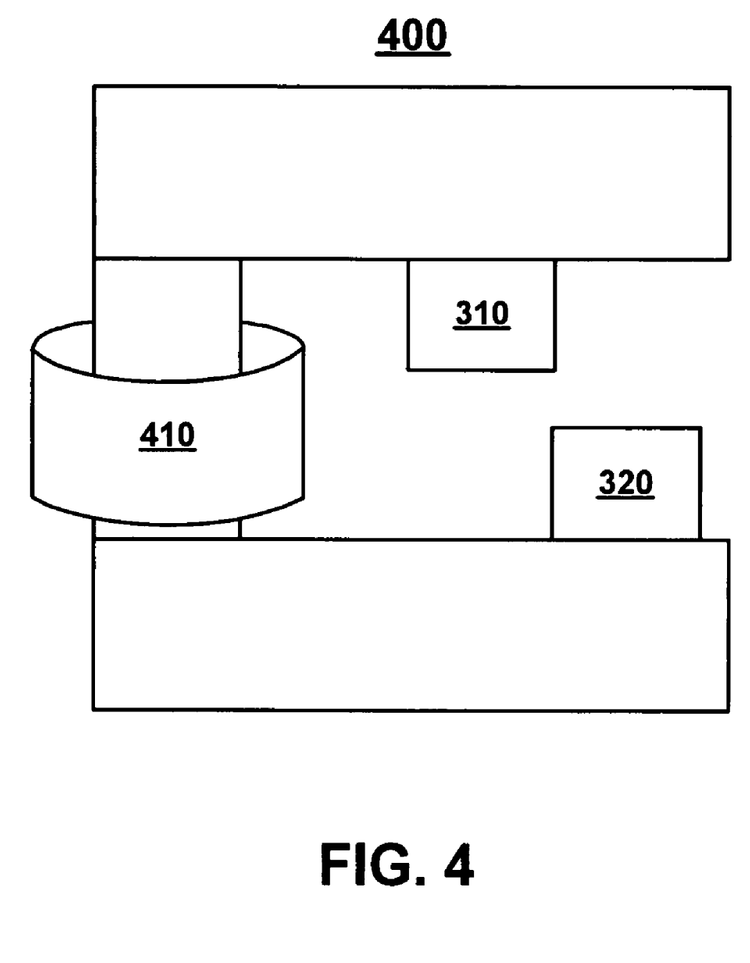
FIG. 4 is a block diagram of an exemplary electromagnet bulk erase tool for erasing perpendicularly recorded media in accordance with one embodiment of the present invention.

With reference now to FIG. 4, a block diagram of an exemplary electromagnet bulk erase tool 400 for erasing perpendicularly recorded media is shown in accordance with another embodiment of the present invention. Bulk erase tool 400 includes a first polarity erase magnet 310 and a second polarity erase magnet 320. In one embodiment, the first polarity erase magnet 310 and the second polarity erase magnet 320 are offset. That is, the poles of the bulk erase tool 400 are misaligned to generate a non-parallel non-vertical applied field such as applied field 330 of FIG. 3. In other words, bulk erase tool 400 is similar in layout to that of bulk erase tool 300. However, unlike bulk erase tool 300, bulk erase tool 400 does not include permanent magnets, instead, the magnets (e.g., 310 and 320) are electromagnets powered by a coil such as coil 410.

Figure 5:
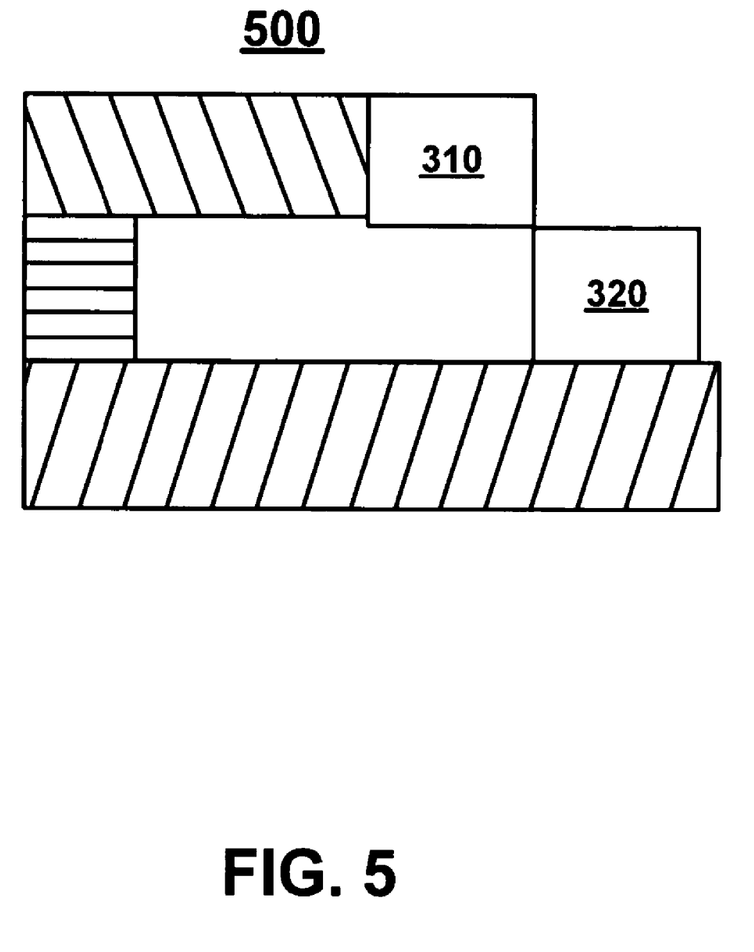
FIG. 5 is a block diagram of an exemplary bulk erase tool having touching offset magnets for erasing perpendicularly recorded media in accordance with one embodiment of the present invention.

Referring now to FIG. 5, a block diagram of an exemplary bulk erase tool 500 having touching offset magnets for erasing perpendicularly recorded media is shown in accordance with one embodiment of the present invention. As shown in FIG. 5, the first polarity erase magnet 310 and the second polarity erase magnet 320 are touching even though they are misaligned. Thus, a non-parallel non-vertical applied field such as field 330 of FIG. 3 is generated. The utilization of the bulk erase tool 500 having touching offset magnets is provided herein for purposes of illustrating the plurality of possible configurations of the bulk erase tool having offset magnets. In other words, the examples provided herein are not design limitations, instead they are provided merely for purposes of brevity and clarity.

Figure 6:
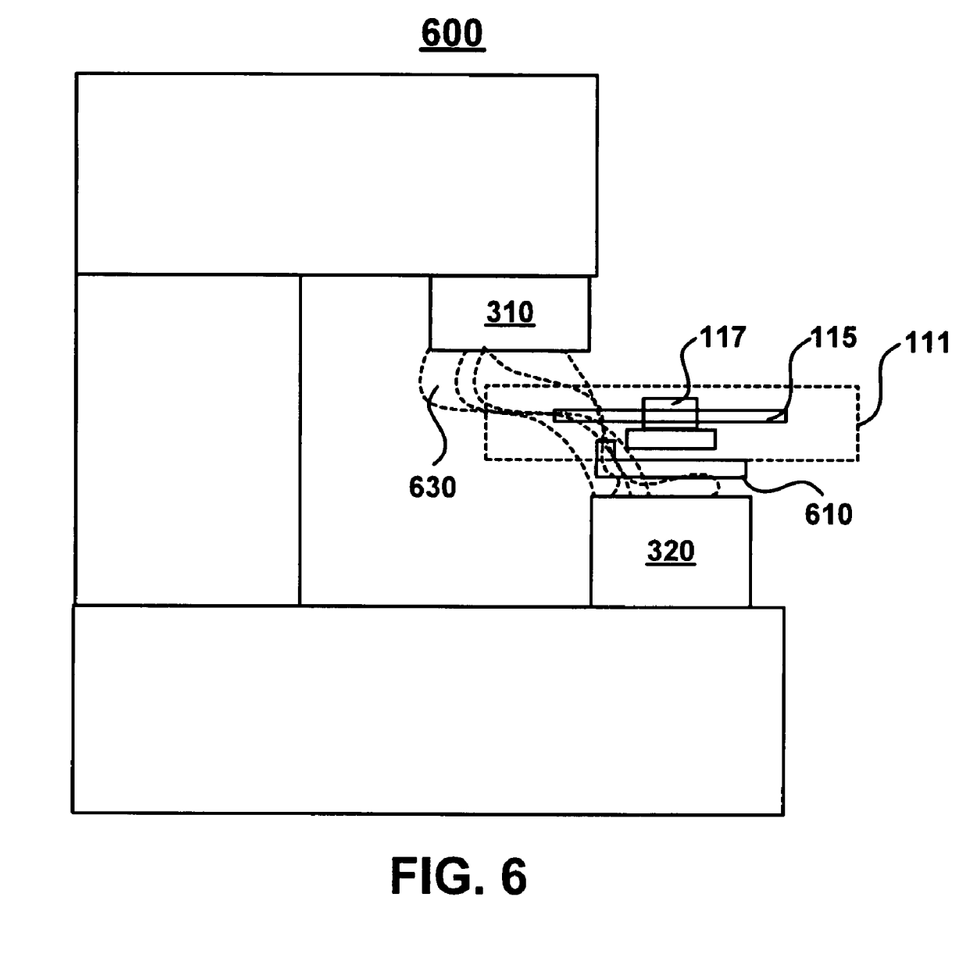
FIG. 6 is a block diagram of an exemplary bulk erase tool for erasing perpendicularly recorded media with an exemplary flux guide in accordance with one embodiment of the present invention.

With reference now to FIG. 6, a block diagram of an exemplary bulk erase tool 600 for erasing perpendicularly recorded media with an exemplary flux guide 610 is shown in accordance with one embodiment of the present invention. Bulk erase tool 600 is similar in form and function as bulk erase tool 300. That is, bulk erase tool 600 includes a first polarity erase magnet 310 and a second polarity erase magnet 320. In one embodiment, the first polarity erase magnet 310 and the second polarity erase magnet 320 are offset permanent magnets. That is, the poles of the permanent magnets of bulk erase tool 600 are misaligned to generate a non-parallel non-vertical applied field 630 such as field 330 of FIG. 3. In one embodiment, the non-parallel non-vertical applied field is approximately at a 45 degree angle with respect to the planer surface of the bulk erase tool 600. Although the applied field 630 is described as approximately 45 degrees, it is understood that the angle of the applied field 630 may be more or less than 45 degrees. The utilization of 45 degrees herein is merely for purposes of brevity and clarity.

Additionally, FIG. 6 includes the flux guide 610. In general, the flux guide 610 is formed utilizing any magnetic material, such as but not limited to, stainless steel, iron, nickel, cobalt, awaruite and the like. In one embodiment, the flux guide 610 is utilized to guide the applied field 630 flow away from the magnet motor 117 of the hard disk drive 111 and toward the disk 115. For example, the flux guide 610 acts as a shield to protect motor magnet 117 from being demagnetized while also acting as a director directing the applied field 630 toward the disk 115 surface. In so doing, the motor magnet 117 is protected from being demagnetized while the disk 115 receives an applied magnet field 630 large enough to ensure total erasure of the disk 115.

Figure 7:
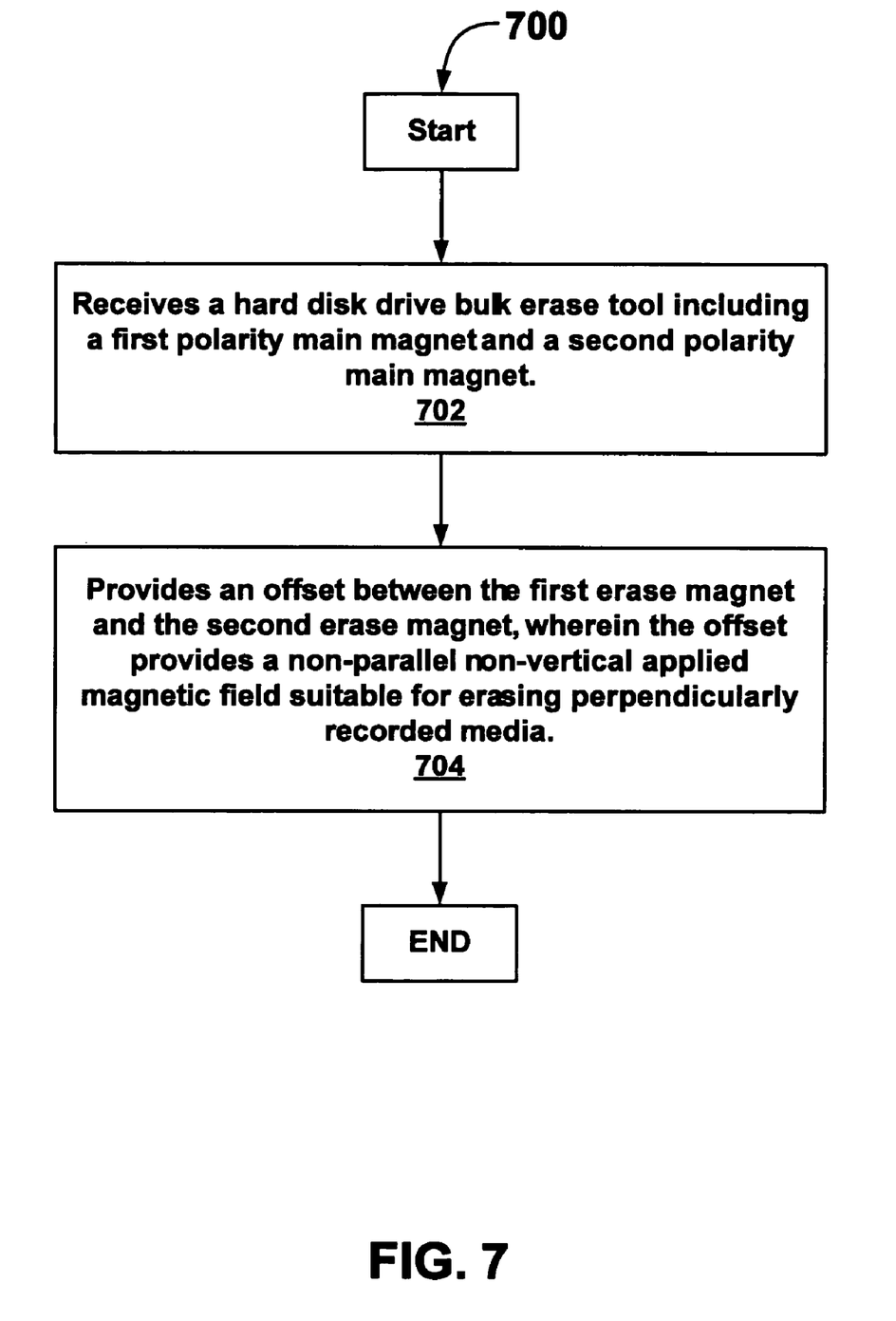
FIG. 7 is a flowchart of a method for utilizing a bulk erase tool for erasing perpendicularly recorded media in accordance with one embodiment of the present invention.

With reference now to FIG. 7, a flowchart 700 of a method for utilizing a bulk erase tool for erasing perpendicularly recorded media is shown in accordance with one embodiment of the present invention. As described herein, a bulk erase tool 300 is a magnetic device for erasing the (servo or other) patterns on the disk 115 of a hard disk drive 111. The advantage of bulk erase over head erase is fast and easy operation. However, as disk coercivity becomes higher, especially in the case of perpendicularly recorded media, the required magnetic field in the bulk erase tool 300 also becomes higher and increases the possibility of damaging the motor magnet 117 and heads 131.

Embodiments described herein, provide an offset of the magnets of the bulk erase tool thereby providing a magnetic field inside the bulk erase tool 300 (as shown in FIG. 3) which provides an angled magnetic field 330 for use in erasing perpendicularly recording (PR) media. Additionally, embodiments described herein provide a flux guide 610, of FIG. 6, for providing a level of magnetic shielding for the motor magnet 117 to significantly reduce unintentional demagnetization of the motor magnet 117 while erasing the disk 115.

With reference to 702 of FIG. 7 and to FIG. 3, one embodiment receives a bulk erase tool 300 having a first polarity magnet 310 and a second polarity magnet 320. As described herein, and shown in FIGS. 3 and 4, the magnets can be either permanent magnets such as shown in FIG. 3, or electromagnets as shown in FIG. 4. Moreover, as shown in FIG. 4, an electromagnetic coil is, in one embodiment, provided for powering the first polarity erase electromagnet 310 and the second polarity erase electromagnet 320.

Referring now to 704 of FIG. 7 and to FIG. 3 or 6, one embodiment provides an offset between the first polarity erase magnet 310 and the second polarity erase magnet 320, wherein the offset provides a non-parallel non-vertical applied magnetic field 610 suitable for erasing perpendicularly recorded media. Normally, the offset between the first polarity erase magnet 310 and the second polarity erase magnet 320 is avoided due to the loss of efficiency of the magnet field. However, PR media has a preferred axis which is normal to the disk 115 surface. By definition, the magnetization of the magnetic grains has a tendency to line up with the preferred axis. Moreover, one of the magnetic characteristics of PR media is Stoner Wohlfarth behavior.

Figure 8:
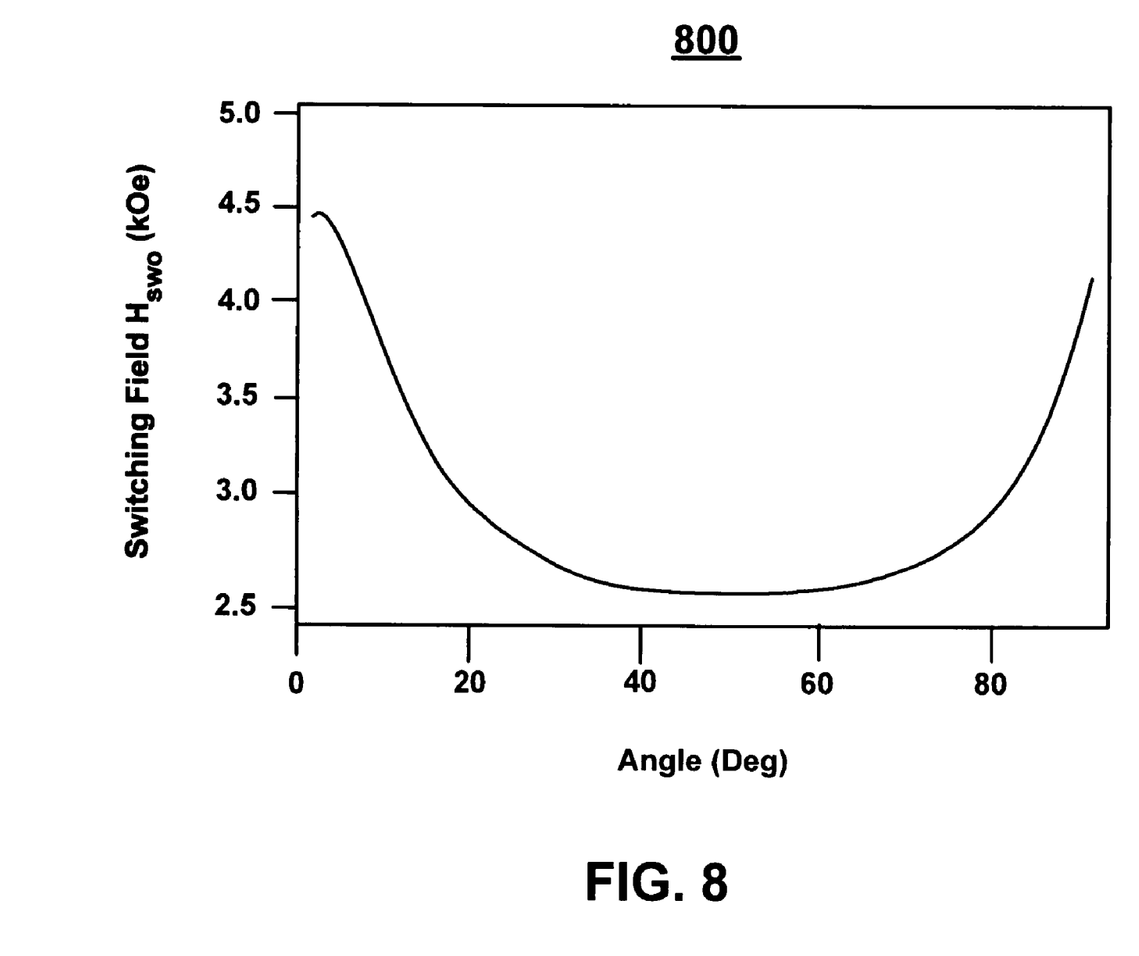
FIG. 8 is a graph of the Stoner Wohlfarth behavior in accordance with one embodiment of the present invention.

With reference now to FIG. 8, a graph 800 of the Stoner Wohlfarth behavior is shown in accordance with one embodiment of the present invention. In general, Stoner Wohlfarth behavior states that the magnitude of the magnetic field required to switch the magnetization of the magnetic grain depends on the direction of the magnetic field. After experimentation with the PR media, it was realized that in one embodiment, a field with 4.0 kOe is required to switch the magnetization of the magnetic grain of PR media when the magnetic field is applied in either a perpendicular or parallel manner. However, when the field is applied at approximately 45 degrees, a field of only 2.5 kOe is required. In other words, the applied angle of 45 degrees significantly reduces the field strength necessary to erase the perpendicularly recorded media. This reduction in field strength also significantly reduces the demagnetization effects felt at the motor magnet 117.

Although in one exemplary embodiment, the non-parallel non-vertical magnetic field is generated at an approximate 45 degree angle. It is understood, and clearly shown in graph 800, that the field may be applied at a variety of angles and at a plurality of strengths. Therefore, by providing the magnetic erase field at an angle other than perpendicular or parallel, as shown in graph 800, the perpendicularly recorded media can be erased utilizing a significantly weaker magnetic field 610. In so doing, the deleterious magnetic impact on the motor magnet 117 is reduced while the quality of the erasure of the disk 115 is maintained.

In an optional embodiment, a flux guide 610 is provided to the bulk erase tool 600 of FIG. 6, the flux guide 610 is utilized to redirect the non-parallel non-vertical applied field to provide protection for a motor magnet 117 of a hard disk drive 111. In other words, when the hard disk drive 111 is inserted into the applied field 630 of the bulk erase tool 600 the flux guide 610 will shield the motor magnet 117 from an excessive dose of applied magnetic field. In one embodiment, the flux guide 610 is formed from a magnetic material in an approximate shape of an "L". Therefore, the flux guide 610 will provide protection for the motor magnet 117 of the hard disk drive 111 while allowing the magnetic field to have full access to the disk 115. In one embodiment, the flux guide 610 is fixedly coupled to the second polarity erase magnet 320. However, in another embodiment, the flux guide 610 operates like a tray that can slide into and out of position with respect to the magnets 310 and 320 to provide easier access and ensure proper placement of the hard disk drive 111 on the flux guide 610 tray.

Thus, embodiments of the present invention provide a method for utilizing a bulk erase tool to erase perpendicularly recorded media. Moreover, embodiments provide a method for utilizing a bulk erase tool to erase perpendicularly recorded media having a flux guiding mechanism for redirecting the non-parallel non-vertical applied field to shield the motor magnets of a hard disk drive. Additionally, embodiments provide a method for utilizing a bulk erase tool to erase perpendicularly recorded media that significantly increases the erase capabilities of the bulk erase tool in regard to perpendicularly recorded media. In so doing, the perpendicularly recorded disk in a hard disk drive is more quickly, efficiently, and properly erased while deleterious magnetic effects on the motor magnet are reduced.

While the method of the embodiment illustrated in flowchart 700 show specific sequences and quantity of steps, the present invention is suitable to alternative embodiments. For example, not all the steps provided for in the methods are required for the present invention. Furthermore, additional steps can be added to the steps presented in the present embodiment. Likewise, the sequences of steps can be modified depending upon the application.

The alternative embodiment(s) of the present invention, a method for utilizing a bulk erase tool to erase perpendicularly recorded media is thus described. While the present invention has been described in particular embodiments, it should be appreciated that the present invention should not be construed as limited by such embodiments, but rather construed according to the below claims.

What is claimed is:

1. A method for utilizing a bulk erase tool to erase perpendicularly recorded media on a hard disk drive comprising:
   receiving said bulk erase tool comprising a first polarity erase magnet and a second polarity erase magnet;
   providing an offset between said first polarity erase magnet and said second polarity erase magnet, wherein said offset provides a non-parallel non-vertical applied magnetic field suitable for erasing perpendicularly recorded media on said hard disk drive without demagnetizing a motor magnet of said hard disk drive; and
   providing a flux guide to said bulk erase tool, said flux guide for redirecting said non-parallel non-vertical applied field to provide a location of protection for a motor magnet of a hard disk drive, when said hard disk drive is inserted into said applied field of said bulk erase tool.

2. The method of claim 1 wherein said non-parallel non-vertical applied magnetic field comprises:
   providing an approximate 45 degree angle applied magnetic field.

3. The method of claim 1 further comprising:
   utilizing permanent magnets as said first polarity erase magnet and said second polarity erase magnet.

4. The method of claim 1 wherein said bulk erase tool further comprises:
   providing an electromagnetic coil for powering said first polarity erase magnet and said second polarity erase magnet.

5. The method of claim 1 wherein said flux guide comprises:
   forming said flux guide from a magnetic material.

6. The method of claim 1 wherein said flux guiding mechanism comprises:
   forming said flux guide in an approximate shape of an "L".

7. The method of claim 1 wherein said flux guide is fixedly coupled with said second polarity erase magnet.

8. A method for utilizing a bulk erase tool to erase perpendicularly recorded media on a disk of a hard disk drive, said method comprising:
   receiving said bulk erase tool comprising a first polarity erase magnet and a second polarity erase magnet;
   providing an offset between said first polarity erase magnet and said second polarity erase magnet, wherein said offset generates a non-parallel non-vertical applied magnetic field suitable for erasing perpendicularly recorded media; and
   providing a flux guide to said bulk erase tool, said flux guide for redirecting said non-parallel non-vertical applied field to provide a location of protection for a motor magnet of a hard disk drive, when said hard disk drive is inserted into said applied field of said bulk erase tool.

9. The method of claim 8 wherein said non-parallel non-vertical applied magnetic field comprises:
   providing an approximate 45 degree angle applied magnetic field.

10. The method of claim 8 further comprising:
    utilizing permanent magnets as said first polarity erase magnet and said second polarity erase magnet.

11. The method of claim 8 wherein said bulk erase tool further comprises:
    providing an electromagnetic coil for powering said first polarity erase magnet and said second polarity erase magnet.

12. The method of claim 8 wherein said flux guide comprises:
    forming said flux guide from a magnetic material.

13. The method of claim 8 wherein said flux guiding mechanism comprises:
    forming said flux guide in an approximate shape of an "L".

14. The method of claim 8 wherein said flux guide is fixedly coupled with said second polarity erase magnet.

15. A method for utilizing a bulk erase tool to erase perpendicularly recorded media on a disk of a hard disk drive, said method comprising:
    receiving said bulk erase tool comprising a first polarity erase magnet and a second polarity erase magnet;
    providing an offset between said first polarity erase magnet and said second polarity erase magnet, wherein said offset provides a non-parallel non-vertical applied magnetic field suitable for erasing perpendicularly recorded media; and
    providing a flux guide formed of a magnetic material to said bulk erase tool, said flux guide is fixedly coupled with said second polarity erase magnet, said flux guide for redirecting said non-parallel non-vertical applied field to provide a location of protection for a motor magnet of a hard disk drive, when said hard disk drive is inserted into said applied field of said bulk erase tool.

16. The method of claim 15 wherein said non-parallel non-vertical applied magnetic field comprises:

providing an approximate 45 degree angle applied magnetic field.

17. The method of claim 15 further comprising:

utilizing permanent magnets as said first polarity erase magnet and said second polarity erase magnet.

18. The method of claim 15 wherein said bulk erase tool further comprises:

providing an electromagnetic coil for powering said first polarity erase magnet and said second polarity erase magnet.

19. The method of claim 15 wherein said flux guiding mechanism comprises:

forming said flux guide in an approximate shape of an "L".

20. A method for utilizing a bulk erase tool to erase perpendicularly recorded media on a hard disk drive comprising:

means for receiving said bulk erase tool comprising a first polarity erase magnet and a second polarity erase magnet;

means for providing an offset between said first polarity erase magnet and said second polarity erase magnet, wherein said offset provides a non-parallel non-vertical applied magnetic field suitable for erasing perpendicularly recorded media on said hard disk drive without demagnetizing a motor magnet of said hard disk drive; and means for providing a flux guide to said bulk erase tool, said flux guide for redirecting said non-parallel non-vertical applied field to provide a location of protection for a motor magnet of a hard disk drive, when said hard disk drive is inserted into said applied field of said bulk erase tool.

* * * * *